(12) United States Patent   (10) Patent No.: US 9,059,933 B2
Doerr et al.                     (45) Date of Patent:      Jun. 16, 2015

(54) PROVISIONING VIRTUAL PRIVATE DATA CENTERS

(71) Applicant: CenturyLink Intellectual Property LLC, Denver, CO (US)

(72) Inventors: Bryan Doerr, Ballwin, MO (US); Kenneth R. Owens, Jr., St. Louis, MO (US); John Chi Yung, Freemont, CA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/875,644

(22) Filed: May 2, 2013

(65) Prior Publication Data

US 2013/0246922 A1    Sep. 19, 2013

Related U.S. Application Data

(63) Continuation of application No. 12/870,594, filed on Aug. 27, 2010, now abandoned, and a continuation-in-part of application No. 12/646,591, filed on Dec. 23, 2009.

(51) Int. Cl.
  *G06F 15/173*    (2006.01)
  *H04L 12/24*     (2006.01)
  *G06F 9/50*      (2006.01)

(52) U.S. Cl.
  CPC .............. *H04L 41/22* (2013.01); *G06F 9/5072* (2013.01)

(58) Field of Classification Search
  USPC .......... 709/225–226, 229, 250; 707/790, 802, 707/E17.005, E17.044
  See application file for complete search history.

(56) References Cited

U.S. PATENT DOCUMENTS

| | | | |
|---|---|---|---|
| 7,093,005 B2 | 8/2006 | Patterson |
| 7,506,264 B2 | 3/2009 | Polan |
| 8,468,455 B2 | 6/2013 | Jorgensen et al. |
| 8,473,627 B2 | 6/2013 | Astete et al. |
| 8,615,400 B2 | 12/2013 | Laventman et al. |
| 8,732,856 B2 | 5/2014 | Sack et al. |
| 2004/0205179 A1 | 10/2004 | Hunt et al. |
| 2005/0160156 A1 | 7/2005 | Kurosawa |

(Continued)

FOREIGN PATENT DOCUMENTS

| | | | |
|---|---|---|---|
| JP | 2004-501413 A | 1/2004 |
| JP | 2004-272908 A | 9/2004 |

(Continued)

OTHER PUBLICATIONS

U.S. Appl. No. 12/646,591; Final Rejection dated Jun. 11, 2012; 19 pages.

(Continued)

*Primary Examiner* — Bharat N Barot
(74) *Attorney, Agent, or Firm* — Swanson & Bratschun, L.L.C.

(57) ABSTRACT

An automatically provisioned virtual private data center provided on a cloud network of multiple virtual private data centers that reside in one or more physical data centers and may migrate between multiple physical data centers. The VPDC is a encapsulated virtual structure provisioned according to customer selected options within a virtual data center having one or more foundation nodes. Different service profiles are provided in a provisioning interface to the customer, each defining several configuration specifics that are used to automatically provision a VPDC for the customer.

19 Claims, 4 Drawing Sheets

(56) References Cited

U.S. PATENT DOCUMENTS

| | | | |
|---|---|---|---|
| 2006/0224623 A1 | 10/2006 | Graziadio et al. | |
| 2007/0005786 A1 | 1/2007 | Kumar et al. | |
| 2008/0076425 A1 | 3/2008 | Khetawat et al. | |
| 2008/0175239 A1* | 7/2008 | Sistanizadeh et al. | 370/390 |
| 2009/0276771 A1* | 11/2009 | Nickolov et al. | 709/229 |
| 2010/0050172 A1 | 2/2010 | Ferris | |
| 2010/0198972 A1 | 8/2010 | Umbehocker | |
| 2011/0035248 A1* | 2/2011 | Juillard | 709/226 |
| 2011/0126197 A1 | 5/2011 | Larsen et al. | |
| 2011/0138384 A1* | 6/2011 | Bozek et al. | 709/226 |
| 2011/0153684 A1* | 6/2011 | Yung | 707/E17.005 |
| 2012/0054624 A1 | 3/2012 | Owens, Jr. et al. | |
| 2013/0070757 A1 | 3/2013 | Elliott et al. | |
| 2013/0290960 A1 | 10/2013 | Astete et al. | |
| 2014/0033200 A1 | 1/2014 | Tompkins | |

FOREIGN PATENT DOCUMENTS

| | | |
|---|---|---|
| JP | 2005-235163 A | 9/2005 |
| WO | WO 01/50329 A2 | 7/2001 |

OTHER PUBLICATIONS

U.S. Appl. No. 12/646,591; Non-Final Rejection dated Feb. 28, 2012; 18 pages.

U.S. Appl. No. 12/870,594; Non-Final Rejection dated Dec. 5, 2012; 13 pages.

International Search Report and Written Opinion prepared by the U.S. Patent Office as International Searching Authority for PCT International Patent Appl. No. PCT/US2010/061736, mailed Feb. 18, 2011; 6 pages.

Partial European Search Report for European Patent Application No. 11177590.4, Oct. 2, 2013, 4 pages.

Kato (2009) 332:38-39, Nikkei Solution Business, Nikkei Business Publications, Inc., "KDDI Cloud Server Service," English translation.

Mori (2009), 29(1):17-26, Unisys Technology Review, Nihon Unisys, Ltd., "A Next Generation iDC Concept 'MiF' of Nihon Unisys," English translation.

Japan Patent Application No. 2012-546183, Office Action dated Oct. 15, 2013, 5 pages, Japan and English translations.

Singapore Patent Application No. 201203972-3; Written Opinion dated Jul. 18, 2013; 6 pages.

Supplemental European Search Report for European Patent Application No. 11177590.4, Aug. 30, 2013, 8 pages.

European Patent Application No. 10840103.5, Communication pursuant to Rules 70(2) and 70a(2) EPC dated Mar. 12, 2014; 1 page.

Partial European Search Report for European Patent Application No. 10840103.5, Feb. 20, 2014, 9 pages.

Communication Pursuant to Article 94(3) for European Patent Application No. 11177590.4, dated May 20, 2014; 7 pages.

Japan Application No. 2012-546183; Decision of Rejection dated Jun. 16, 2014; 4 pages; Japanese and English Translation.

U.S. Appl. No. 12/646,591; Notice of Allowance dated Mar. 18, 2015; 32 pages.

\* cited by examiner

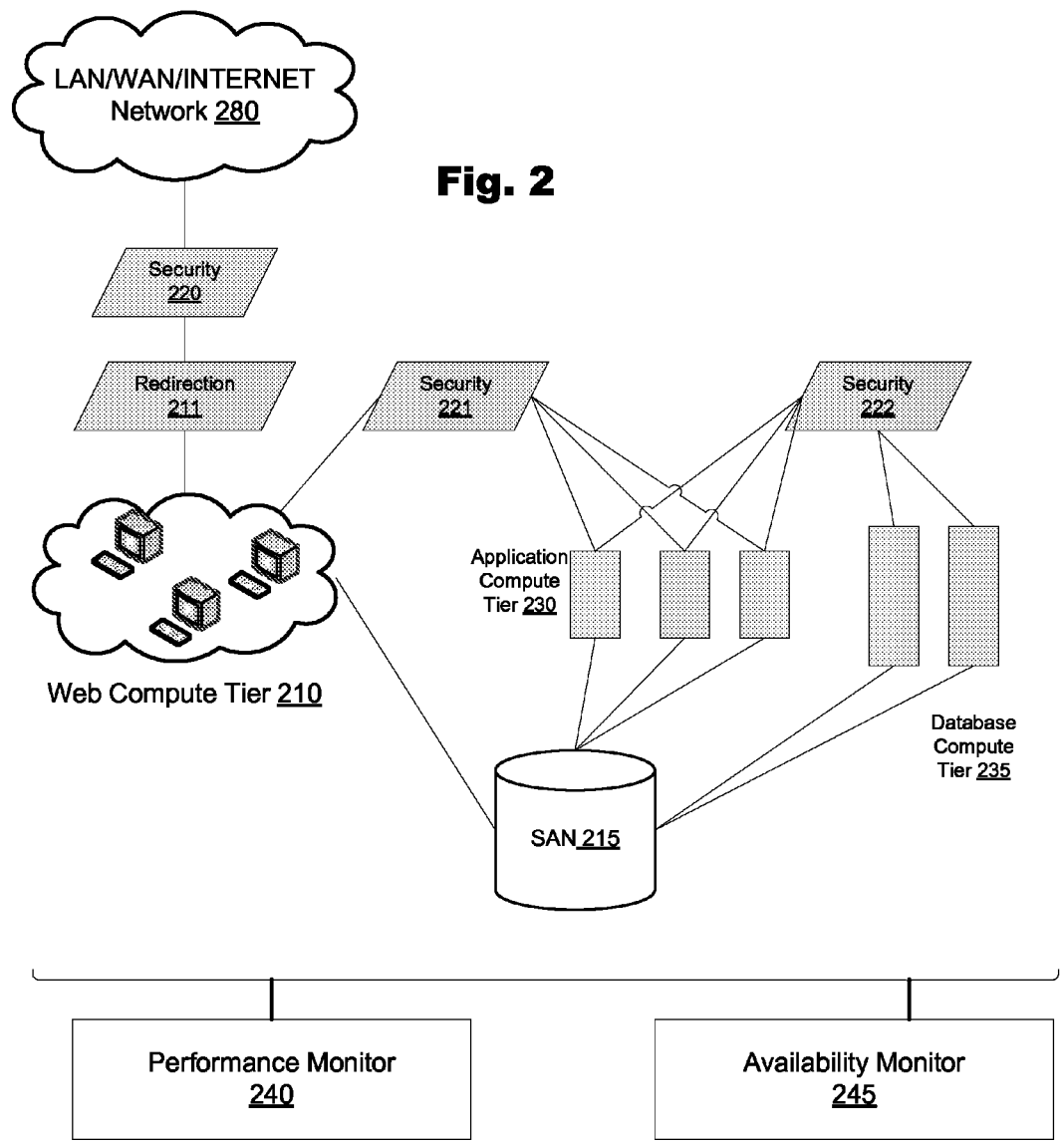

PROVISIONING VIRTUAL PRIVATE DATA CENTERS

CROSS REFERENCE TO RELATED APPLICATION

This application is a continuation of U.S. patent application No. 12/870,594, filed Aug. 27, 2010 by Owens, Jr. et al. and entitled, "Systems and Methods for a Multi-Tenant System Providing Virtual Data Centers in a Cloud Configuration," and a continuation-in-part of U.S. patent application No. 12/646,591 filed Dec. 23, 2009 by Yung and entitled, "Systems and Methods for Automatic Provisioning of a User Designed Virtual Private Data Center in a Multi-Tenant System," both of which are hereby incorporated by reference in its entirety.

BACKGROUND

Enterprise customers, such as businesses, non-profits, governments, etc., continue to rely on information technology and network architectures as their communication and productivity infrastructure. With the continued increase in public network bandwidth and availability, these IT and network services may be provided by outside companies, which leverage shared resources and expertise to provide a greater cost-savings to subscribing customers.

These outside companies may provide Virtual Computing environments, which may include a virtual component for nearly every conceivable physical component. Virtual disks, virtual processors, virtual LANS, etc. All of these virtual elements may be run on large physical counterparts, capable of efficiently and cost-effectively serving multiple virtual version (e.g., multiple virtual machines may run on a single large server). Further, by servicing multiple customers, not only is the equipment more cost-effective (e.g., as compared to each customer purchasing smaller machines individually), but the total resources needed is reduced. While each individual customer would need to plan for peak usage, a shared system may need only prepare for the aggregate peak, which may be smaller by mismatches between peak usage. For example, time differences, demographic differences, product release timing, and any number of other things may allow one customer's peak to align with other customers' lulls, providing less variance in usage rates.

Thus, there exists a need in the art for greater distribution, greater virtualization, and greater efficiency in provisioning, maintenance, and customer control/management tools.

BRIEF DESCRIPTION OF THE DRAWINGS

FIG. 2 illustrates a Virtual Private Data Center structure, according to one example embodiment of the present invention.

DETAILED DESCRIPTION

The present invention provides a modularized Virtual Private Data Center (VPDC) structure within a cloud of various Physical Data Centers (PDC) for providing data services to a plurality of distinct customers. The term "cloud computing" may carry various meanings in the industry, but example embodiments of the present invention relate to two key aspects of the cloud arrangement. First, abstracting as much of the technical details away from the end user and into the backend structure. Second, allowing those abstracted technical details to be implemented in any number of physical locations, e.g., seamlessly moving from PDC to PDC.

Figure 1A:
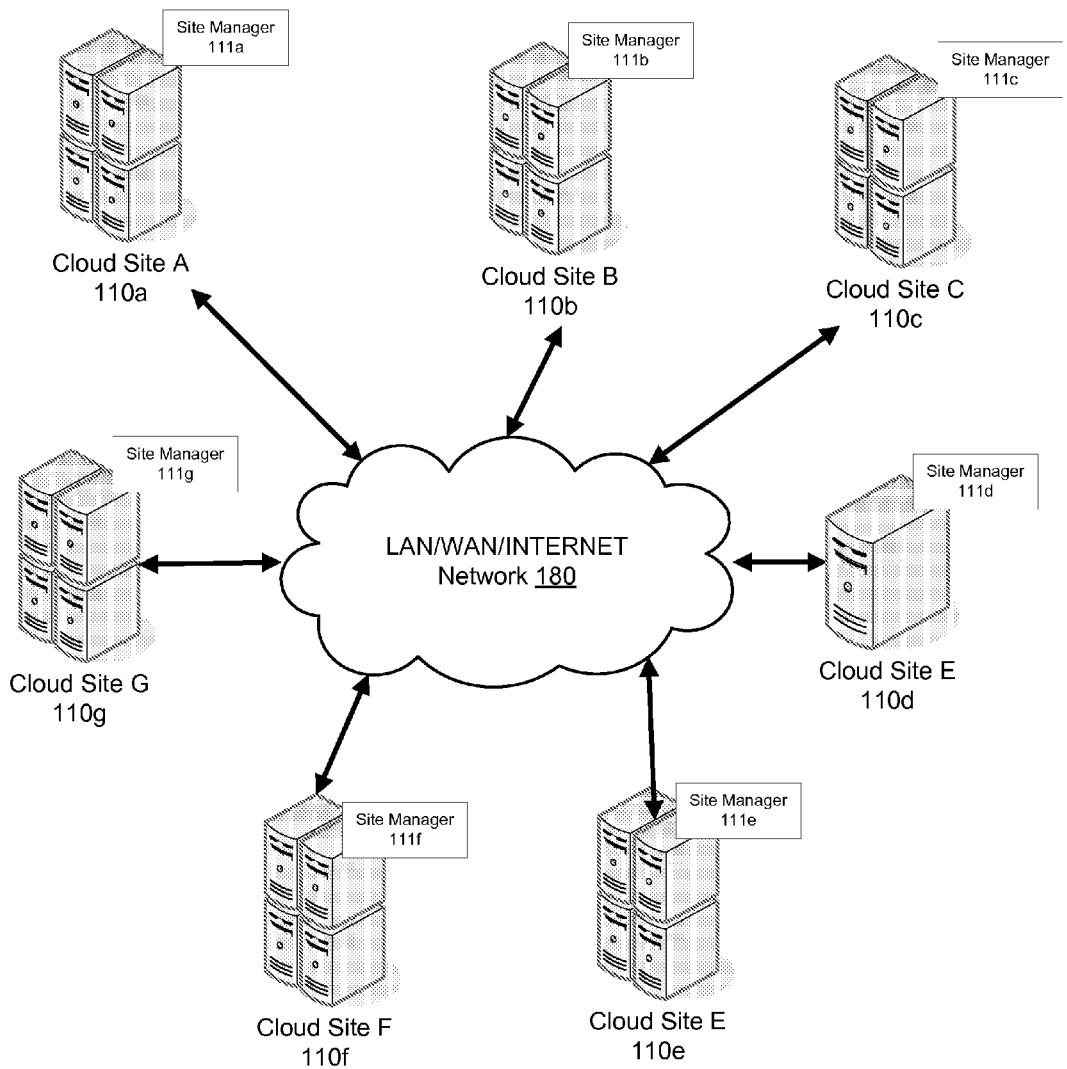
FIG. 1A illustrates a network of physical data centers as cloud sites, according to one example embodiment of the present invention.

FIG. 1A illustrates one example embodiment of a cloud-based virtual datacenter network. Each cloud site (e.g., 110a to 110g) may include a standard set of hardware. Alternatively, each cloud site may have a different set of hardware, but each set may be configurable to provide a standard set of resources as a provisioned VPDC. Hardware may include servers, routers, firewalls, SANs, and any number of other hardware devices. Each site may have a different quantity of provisional resources (e.g., 110d), but may provide at least one foundation point of deployment (e.g., as discussed below) with sufficient resources to provision at least on standardized VPDC.

Each cloud site may include a site manager 110, which may include the hardware and software to provision, monitor, and maintain the various VPDCs located within the cloud site. The site manager may reside on an independent server, or may be incorporated into the servers used to provision VPDCs. The site manager 110 may also be responsive for facilitating the moving of VPDCs from one cloud site to another. Should a site fail, or become overused, VPDCs may migrate to entirely different sites. By fixing the structure of the VPDCs abstractly, all of the configuration and service data may be transferred to another site, and repositioned at the new site (on identical hardware or different hardware). Each VPDC may be provisioned according to a service level with customizable options. Each manager may provision certain resources to meet the specifications of the provisioning requirements, and control access to the VPDC for an assigned user.

Cloud sites are multi-tenant sites. Only one user-entity (e.g., a single person, a single company, a single association, a group of related entities) may be assigned to a VPDC, in a similar fashion as a physical PDC that is assigned to only one user-entity (e.g., a university). Each cloud site may then have a plurality of VPDCs provisioned within one or more foundation PODs. A single user-entity may have multiple VPDCs assigned to them. While additional resources may be provisioned within a customer's single VPDC, some customers may require multiple VPDCs. The cloud site contains various resources, such as compute, storage, network, etc., which may be provisioned according to specifications provided to the site manager 110, and the foundation POD services (discussed below).

Figure 1B:
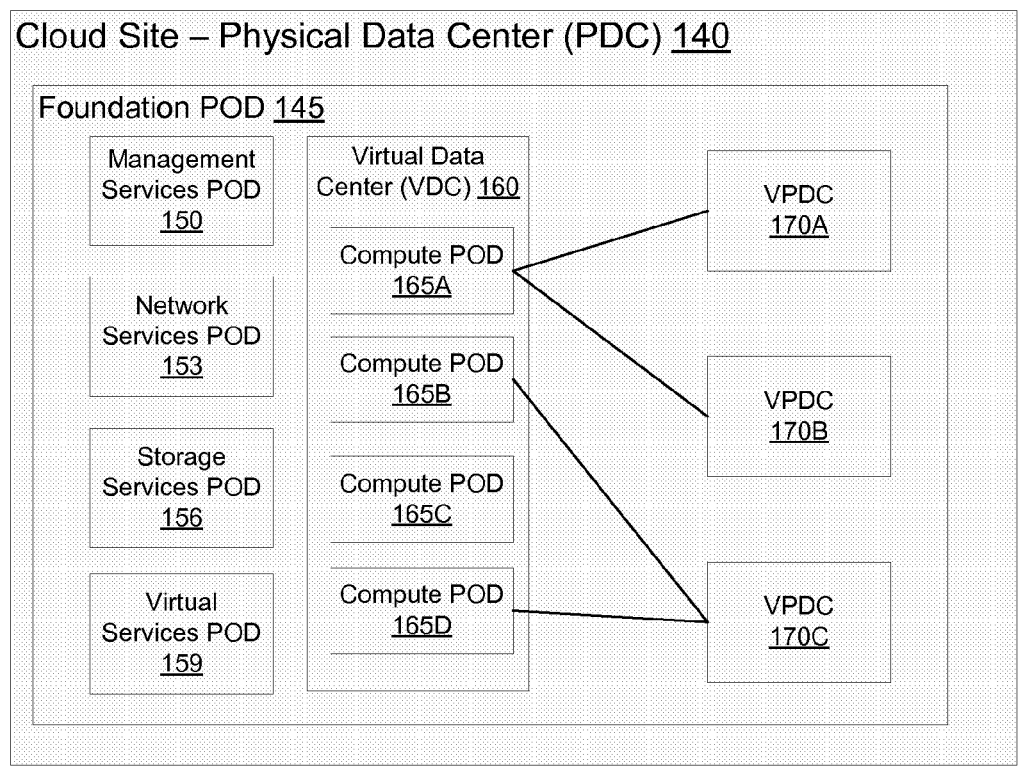
FIG. 1B illustrates an organizational structure of cloud site components, according to one example embodiment of the present invention.

Example cloud sites may include one or more Foundation PODs to comprise the Physical Data Center 140. These embodiments of the present invention provide "PODs," points of deployment, for use in tenant provisioning of VPDCs. The Foundation PODs may include a plurality of Service PODs, which may include data structures that store configuration data for each service type provided by the cloud representing all levels of available for use in a VPDC. FIG. 1B may illustrate one of the PDCs, which may be organized into several Points of Deployment (PODs). Each Foundation POD may include several Service PODs, while each Virtual Data Center (VDC) may include several Compute PODs. The VDC may include (e.g., via the several Compute PODs) the resources that may be provisioned for a customer, such as servers and processor throughput, data drives and databases, network links and bandwidth, etc. The Foundation POD may contain Management, Network, Storage, and Virtual Services PODs which may provide the VDCs with all the services required to provide network connectivity 280, redirection 211, outside firewall 220, tier connectivity to the SAN 215, performance metrics 240, and availability metrics 245. The VDC may consist of all the Compute PODs which may provide the services required for application deployment, e.g., 210, 230, 235, 221, and 222. These structures (e.g., the Foundation POD and VDC) may comprise the raw material for the provisioning of a customer's Virtual Private Data Center (VPDC). One or more VPDCs may then be carved out within the VDC to capture all the configuration and management details required within the Compute, Management, Network, Storage, and Virtual Services environments of the Cloud site tied to a single customers cloud environment. Each cloud site (e.g., PDC) may contain multiple Foundation PODs, and each Foundational POD may contain multiple VDCs. Each cloud site may have different resources, but those resources may be configured to provide one or more standardized Foundation PODs (e.g., FIG. 1B), with may be used to partition out one or more VPDCs.

The compute PODs, e.g., 165 may include of the VDC's compute environments and may include components such as clusters of ESX hosts and Storage Area Networks (SANs) for ESX host storage. The compute PODs may include local networking, such as one or more Top of Rack Switches. While there may be several levels of security, the compute PODs may include a server level firewall and file integrity monitoring services. From these resources, customers may be provisioned VMs with network, storage, and security rules from the ESX Hosts within a cluster. The network POD may consist of core network connectivity functions, including the management and provisioning of connectivity to the compute PODs, to a Management Network, and to an outside, public network, e.g. the Internet.

The Management Services POD, e.g. 150 may consist of all the managers for the different system elements and for the VPDC management servers (e.g., those that manage the compute, storage, security, and network resources). The virtual services POD may perform such tasks as server load balancing and provide another tier of firewall security, such as a perimeter firewall service. From these service PODs and compute PODs a customer may be provisioned one or move VPDCs, which will include a set of VMs, security policy, and a network policy. By grouping the services all together into a single-VPDC-instance model, the design may be modularly or discreetly contained, and thus may be able to move around within the VDC, Cloud Site, and between Cloud Sites with automated reconfiguration of services. These services may be management and/or virtual (e.g., URL, DNS, and Server Load Balancing). Additionally, all the SLAs and historical data may be preserved with the VPDC as it migrates around.

FIG. 2 illustrates a Virtual Private Data Center (VPDC) 200 according to an embodiment of the present invention. A VPDC 200 is a set of cloud resources (e.g., servers, firewalls, networking, storage, etc.) provisioned to support a virtual private data center of a single tenant. Thus, as applied to a single tenant, the resources of the cloud 100 (FIGS. 1A and 1B) appear as illustrated in FIG. 2. The VPDC 200 may include security resources 220, 221, 222; computational resources 210, 230, 235; storage resources 215, and networking resources, e.g., connections to network 280. Each of these resources may be provisioned by a tenant prior to deployment according to the tenant's selections of service level and options during a provisioning phase.

Security resources represent hardware and software firewalls, access control lists, hash checkers and file integrity monitoring systems, encrypters/decrypters, etc. The physical firewalls may be shared by multiple tenants, and have virtual private firewalls allocated from that shared resource. The cloud provider may manage resource allocation at both the physical and virtual level to ensure optimal performance for each customer, within their service level selections.

Computing resources represent servers, including processors, local memory, and I/O connections. Most of a client's transactional data may be stored in specialized high volume data drives, but the servers may include several levels of memory, including long-term memory, for storing configuration data used to provision virtual machines and other services related to computing resources. The compute resource may represent the smallest unit of customer data. Each compute resource may be dedicated to a single customer or single VPDC, and individual computes may not be shared. The physical server may be carved up into these smaller compute resource units. These compute resources may then contain the customer's workloads. Each compute resource may have security, network, and storage resources allocated to it. Furthermore, the VPDC may define a grouping construct that takes each compute resource (along with its security, network, and storage resources) and their configurations together to make up a compute grouping. All of these computes may be defined by XML data and managed as a group.

Storage resources represent storage for both configuration data (that which defines the virtual systems) and transactional data (data generated by the user). Storage may include a number of persistent memory levels, including hard drives at the server level, solid state drives and caches, large drive arrays for low-latency network storage, slower drive arrays for less latency-critical storage, and long-terms archive and backup drives.

Networking resources represent routers, gateways, bridges, data-lines, switches, and hubs for organizing and facilitating network traffic within the cloud site. Some of these items may be used for the overall system, while others, or parts of others, may be provisioned to a specific VPDC. Networking resources also represent connections to an outside network (e.g., the Internet and/or various private/semi-private networks). Connections to the outside may be measured in bandwidth or traffic throughput. Network resources may include certain degrees of the overall bandwidth, certain data rate maximums, certain number of connections, or some combination of these. Additionally or alternatively, network resources may be defined by a priority, (e.g., a QoS priority level discussed further below).

The cloud may include a performance monitor 240 and availability monitor 245. These may server two broad functions. First, they may be used to monitor the use (or overuse) of various resources by the cloud providers. Who may then use the data for strategic decisions, such as pricing, new resource planning, new client acceptance planning, etc. Further, the performance monitor and availability monitor, may together perform one or more load balancing functions, ensuring the best availability for each customer, according to their service level selections and current resource availability. Second, these monitors may be used in assisting customers make selections for their VPDCs, and determine how efficient/effective their current VPDCs are handing the loads placed on them. Customers may see how much latency their low service level VPDC is experiencing, including delays, denial of service, and request-to-result computation times, and decide is upgrading is a cost-effective option.

Within each of the VPDCs, there may be a collection of Network, Security, Storage, and Compute configurations and processes. These collections are designed to support a multi-tenant deployment infrastructure in separate logical containers that support multiple levels of service per deployment. The services may define, configure, provision, monitor, and/or control each of the resources discussed above. These definitions may be broken into several pre-defined service levels. The multiple levels of service provide various levels of support for each of the service categories of the VPDC, e.g., Network SLAs, Security SLAs, and Storage SLAs Compute SLAs, QoS, and backup levels. FIG. 2 illustrates one example embodiment of a VPDC. Each VPDC may connect to a wide area network 280, e.g., a public network such as the Internet, via a first external firewall 220. Security element 220 may include any number of other network security devices. On the other side of security element 220 there may be a cluster of web compute tier 210, such as web accessible VMs and UIs. Further security 221 and 222 may separate the various compute tiers, such as the application compute tier 230 and the database compute tier 235. Each of the various compute tiers may interface with one or more storage area networks 215. Further, the example system may include a performance monitor 240 that may indicate how the system is performing, how well the quality of service is being maintained, how long user latencies are, and how over or under worked the provisioned resources are. There may also be an availability monitor 245, which may monitor for downtime, failed connections, and/or any other system failures.

A VPDC may include a service profile to define one or more distinct service levels and/or qualities. Example embodiments may provide several separate and distinguishable service levels for selection by the various VPDCs. The VPDC may provide the logical base container for a customer build, because the VPDC may consist of all the configuration and processes required to support the application deployment architecture of the customer, that is, the virtual system carved out of the physical resources for a particular user according to specified configuration data where the particular user's proprietary and/or shared applications are executed. The VPDC may capture information about how various software architecture layers are connected together, the communication requirements between the layers, the security of the communication and data, and the storage lifecycle requirements along with any retention levels.

Each VPDC may be further defined by the Service Profile selected by the customer. The ability to abstract various support, process, and configuration attributes from the overall application lifecycle process may be necessary to provide the multi-tenant multiple-QoS levels that the application-deployment lifecycle(s) require. An example application deployment lifecycle may consist of development/Test, Quality Assurance, and Production.

The configuration of the VPDC from selecting the service tier to specific configuration of the actual application architecture is captured as meta-data in XML and enhanced through the middleware software level within the VPDC architecture. The manifest is then sent to the VPDC engine to provision the VPDC into the infrastructure where specific Network, Security, Storage, and Compute aspects are provisioned and monitored for adherence to SLAs, support, process, and billing.

A key architectural aspect in providing a cloud based VPDC experience may include the concept of Service Profiles. Example embodiments of the present invention are able to create separate distinguishable service levels and qualities, which may be accomplished by defining a minimum set of essential architectural components required to deploy a cloud computing infrastructure, and further define enhanced packages above the minimum. For example, three service levels may be provided, an essential service level, a balanced service level, and a premier service level.

TABLE 1

Example Service Tier Specifics:

| TYPE/ LEVEL | ESSENTIAL | BALANCED | PREMIER |
| --- | --- | --- | --- |
| Security | Port ACLs | Perimeter firewall Server tier firewalls | WAF File integrity checker |
| Storage | 16 VM disks per LUN | 8 VM disks per LUN | 4 VM disks per LUN |
| Network | Best effort QoS | Priority 4 QoS | Priority 5 QoS |

The example attributes of three example service levels illustrated in table 1 could be any number of other configurations, attributes, or quality levels. The examples for the security service type may be cumulative, such that port access control lists (ACLs) may be used in all three service tiers, while the balanced tier also includes a perimeter firewall and a server tier firewall. Likewise, these services may be provided at the premier service level with the added services of a file integrity checker and a web application firewall. With regard to storage, the size, speed, and specs of a logical unit number (LUN) may change (e.g., increase/improve with technology), the service tiers may be broken down by the number of Virtual Machine disks that are carved out of a single LUN. Network service levels may follow industry standard Quality of Service (QoS) priority levels. For example, the essential service may provide only QoS priority 0, or a common "best effort" service level. Priority 4 may include a controlled load, and may be most suitable for applications such as streaming media or multi-player gaming. Priority 5 may include latency and jitter tolerances suitable for applications such as interactive video/audio (e.g., IP telephony). A more detailed example is shown below in Table 2, which is written in XML and illustrates one example of an XML interface for automatically provisioning VPDCs based on service levels.

In order to facilitate automatic provisioning of VPDC in a cloud format, a Cloud OS may be provided to envelope and harmonize a plurality of individual pieces, some pre-existing, some new to this application. The Cloud OS may provide all the business intelligence and process integration logic for the VPDC. The root of the VPDC may include an XML based service catalog with meta-data that captures the business and process logic of the VPDC. This may be accomplished by developing a Service Catalog that enables VPDC service differentiation to be captured as XML metadata. Table 2 illustrates an example service catalog. Each service profile (e.g., Enterprise, Balanced, and Essential) includes the same or similar attribute types, e.g., location, load balancer level, 1-to-1 Network Address Translation, VM machine specs, etc., while each of these vary in size and quality across the service profiles.

TABLE 2

Example XML Service Catalog Code.

```xml
<serviceCatalog xmlns:xsi=site schemaVersion="1.0" xsi:schemaLocation="URL" xmlns="URL">
    <product name="Cloud2.0" version="1">
        <serviceProfiles>
            <serviceProfile name="Enterprise">
                <locationOptions name="metro">
                    <option>Santa Clara</option>
                    <option>Boston</option>
                    <option>London</option>
                </locationOptions>
                <supportedOSes customerImage="disabled">
                    <supportedOS name="rhel4_64Guest" label="RH Linux 4.x"
                        description="Red Hat Enterprise Linux 4.x 64bit" type="linux" showOutsourcingOption="no" />
                    <supportedOS name="rhel5_64Guest" label="RH Linux 5.x"
                        description="Red Hat Enterprise Linux 5.x 64bit" type="linux" showOutsourcingOption="no" />
                    <supportedOS name="winNetEnterprise64Guest" label="Windows Server 2003 (Ent)"
                        description="Microsoft Windows Server 2003 (Enterprise 64bit)" type="windows"
                        showOutsourcingOption="yes" />
                </supportedOSes>
                <loadBalancerMax>4</loadBalancerMax>
                <nat1to1Available>true</nat1to1Available>
                <computeProfile>
                    <size name="Small">
                        <cpu speed="3" unit="GHz" vCPU="2"/>
                        <memory size="2" unit="GB"/>
                        <drs pool="Enterprise – 2"/>
                        <serverHA>enabled</serverHA>
                    </size>
                    <size name="Medium">
                        <cpu speed="3" unit="GHz" vCPU="2"/>
                        <memory size="8" unit="GB"/>
                        <drs pool="Enterprise – 8"/>
                        <serverHA>enabled</serverHA>
                    </size>
                    <size name="Large">
                        <cpu speed="3" unit="GHz" vCPU="4"/>
                        <memory size="16" unit="GB"/>
                        <drs pool="Enterprise – 16"/>
                        <serverHA>enabled</serverHA>
                    </size>
                </computeProfile>
                <networkProfile>
                    <vlans Public="1" Private="4">
                        <vlan type="Public" maxComputes="0" id="Outside Transit"/>
                        <vlan type="Private" maxComputes="0" id="Inside Transit"/>
                        <vlan type="Private" maxComputes="123" id="VM Tier01">
                            <serverGroup>VM Tier01</serverGroup>
                        </vlan>
                        <vlan type="Private" maxComputes="123" id="VM Tier02">
                            <serverGroup>VM Tier02</serverGroup>
                        </vlan>
                        <vlan type="Private" maxComputes="123" id="VM Tier03">
                            <serverGroup>VM Tier03</serverGroup>
                        </vlan>
                    </vlans>
                    <networkIO>100M Guarantee, Class=Medium</networkIO>
                    <internetBandwidth>Zero Commit, 95th Percentile Burst Model</internetBandwidth>
                    <applicationPriority pip="enabled"/>
                    <sslOffloading ssl="enabled" maxCert="4" customerCert="true"/>
                    <serverLB>
                        <loadBalancing>enabled</loadBalancing>
                        <poolingInterval>true</poolingInterval>
                        <persistence>
                            <option val="Source IP" default="yes"/>
                            <option val="Active Cookie" default="no"/>
                            <option val="Passive Cookie" default="no"/>
                        </persistence>
                    </serverLB>
                    <glbAcceleration glb="no" maxServersPerDomainName="4"/>
                </networkProfile>
                <storageProfile>
                    <dataStorage>
                        <drives>
                            <drive type="boot" required="yes" incremental="no">
                                <size unit="GB" min="15" max="15" incremental="0" default="15"/>
                                <mountPointOptions>
                                    <mountPoint type="windows" defaultName="C:\"/>
                                    <mountPoint type="linux" defaultName="/"/>
                                </mountPointOptions>
```

TABLE 2-continued

Example XML Service Catalog Code.

```xml
        </drive>
        <drive type="data" required="yes" incremental="yes">
            <size unit="GB" min="10" max="500" incremental="50" default="10"/>
            <mountPointOptions>
                <mountPoint type="windows" defaultName="D:\"/>
                <mountPoint type="linux" defaultName="/data01"/>
            </mountPointOptions>
        </drive>
        <drive type="data" required="no" incremental="yes">
            <size unit="GB" min="50" max="500" incremental="50" default="50"/>
            <mountPointOptions>
                <mountPoint type="windows" defaultName="E:\"/>
                <mountPoint type="linux" defaultName="/data02"/>
            </mountPointOptions>
        </drive>
        <drive type="data" required="no" incremental="yes">
            <size unit="GB" min="50" max="500" incremental="50" default="50"/>
            <mountPointOptions>
                <mountPoint type="windows" defaultName="F:\"/>
                <mountPoint type="linux" defaultName="/data03"/>
            </mountPointOptions>
        </drive>
    </drives>
    </dataStorage>
    <performance>3 Tier ILM</performance>
    <accessMethod>Block Based SAN</accessMethod>
    <availability>Dual Path Redundant SAN</availability>
    <primaryDataProtection>SNAP copies every 4 hours, 36 hour retention</primaryDataProtection>
    <secondaryDataProtection description="Backup retention">
        <retention length="1" unit="month" default="yes"/>
        <retention length="3" unit="month"/>
        <retention length="6" unit="month"/>
        <retention length="12" unit="month"/>
        <retention length="36" unit="month"/>
        <retention length="84" unit="month"/>
    </secondaryDataProtection>
    </storageProfile>
    <securityProfile>
        <perimeterFirewall enabled="true">Enterprise Grade Virtual Firewall (Enterprise Resource Classes)
        </perimeterFirewall>
        <serverTierFirewall enabled="true">Enterprise Grade Stateful Firewall</serverTierFirewall>
        <intrusionDetectionSystem enabled="true">
                        VMsafe Compatible Virtual IPS</intrusionDetectionSystem>
        <securityACLs enabled="true">Configurable Port Profile ACL per server tier</securityACLs>
        <fileIntegrityMonitoring enabled="true">Enabled</fileIntegrityMonitoring>
        <urlFiltering enabled="true">Enabled</urlFiltering>
        <waf>
            <learningMode days="60"/>
            <learningMode days="90"/>
            <learningMode days="120"/>
        </waf>
    </securityProfile>
</serviceProfile>
<serviceProfile name="Balanced">
    <locationOptions name="regional">
        <option>North America</option>
        <option>Europe Middle East Africa</option>
        <option>Asia</option>
    </locationOptions>
    <supportedOSes customerImage="disabled">
        <supportedOS name="rhel4_64Guest" label="RH Linux 4.x" description ="Red Hat Enterprise Linux 4.x 64bit" type="linux" showOutsourcingOption="no" />
        <supportedOS name="rhel5_64Guest" label="RH Linux 5.x" description ="Red Hat Enterprise Linux 5.x 64bit" type="linux" showOutsourcingOption="no" />
        <supportedOS name="winNetEnterprise64Guest" label="Windows Server 2003 (Ent)" description="Microsoft Windows Server 2003 (Enterprise 64bit)" type="windows" showOutsourcingOption="yes" />
    </supportedOSes>
    <loadBalancerMax>1</loadBalancerMax>
    <nat1to1Available>true</nat1to1Available>
    <computeProfile>
        <size name="Small">
            <cpu speed="3" unit="GHz" vCPU="1"/>
            <memory size="2" unit="GB"/>
            <drs pool="Balanced"/>
            <serverHA>enabled</serverHA>
        </size>
        <size name="Medium">
            <cpu speed="3" unit="GHz" vCPU="1"/>
```

TABLE 2-continued

Example XML Service Catalog Code.

```xml
            <memory size="4" unit="GB"/>
            <drs pool="Balanced"/>
            <serverHA>enabled</serverHA>
        </size>
        <size name="Large">
            <cpu speed="3" unit="GHz" vCPU="2"/>
            <memory size="8" unit="GB"/>
            <drs pool="Balanced"/>
            <serverHA>enabled</serverHA>
        </size>
</computeProfile>
<networkProfile>
    <vlans Public="1" Private="1">
        <vlan type="Public" maxComputes="0" id ="Outside Transit"/>
        <vlan type="Private" maxComputes="123" id="VM Tier01">
            <serverGroup>VM Tier01</serverGroup>
            <serverGroup>VM Tier02</serverGroup>
            <serverGroup>VM Tier03</serverGroup>
        </vlan>
    </vlans>
    <networkIO>100M Guarantee, Class=Medium</networkIO>
    <internetBandwidth>Zero Commit, 95th Percentile Burst Model</internetBandwidth>
    <applicationPriority pip="enabled"/>
    <sslOffloading ssl="enabled" maxCert="1" customerCert="true"/>
    <serverLB>
        <loadBalancing>enabled</loadBalancing>
        <poolingInterval>true</poolingInterval>
        <persistence>
            <option val="Source IP"/>
            <option val="Active Cookie"/>
            <option val="Passive Cookie"/>
        </persistence>
    </serverLB>
    <glbAcceleration glb="disabled" maxServersPerDomainName="0"/>
</networkProfile>
<storageProfile>
    <dataStorage>
        <drives>
            <drive type="boot" required="yes" incremental="no">
                <size unit="GB" min="15" max="15" incremental="0" default="15"/>
                <mountPointOptions>
                    <mountPoint type="windows" defaultName="C:\"/>
                    <mountPoint type="linux" defaultName="/"/>
                </mountPointOptions>
            </drive>
            <drive type="data" required="yes" incremental="yes">
                <size unit="GB" min="10" max="500" incremental="50" default="10"/>
                <mountPointOptions>
                    <mountPoint type="windows" defaultName="D:\"/>
                    <mountPoint type="linux" defaultName="/data01"/>
                </mountPointOptions>
            </drive>
            <drive type="data" required="no" incremental="yes">
                <size unit="GB" min="50" max="500" incremental="50" default="50"/>
                <mountPointOptions>
                    <mountPoint type="windows" defaultName="E:\"/>
                    <mountPoint type="linux" defaultName="/data02"/>
                </mountPointOptions>
            </drive>
            <drive type="data" required="no" incremental="yes">
                <size unit="GB" min="50" max="500" incremental="50" default="50"/>
                <mountPointOptions>
                    <mountPoint type="windows" defaultName="F:\"/>
                    <mountPoint type="linux" defaultName="/data03"/>
                </mountPointOptions>
            </drive>
        </drives>
    </dataStorage>
    <performance>2 Tier ILM</performance>
    <accessMethod>Block Based SAN</accessMethod>
    <availability>Dual Path Redundant SAN</availability>
    <primaryDataProtection>SNAP copies every 8 hours, 36 hour retention</primaryDataProtection>
    <secondaryDataProtection description="Backup retention">
        <retention length="1" unit="month"/>
        <retention length="3" unit="month"/>
        <retention length="6" unit="month"/>
        <retention length="12" unit="month"/>
        <retention length="36" unit="month"/>
```

TABLE 2-continued

Example XML Service Catalog Code.

```xml
            <retention length="84" unit="month"/>
        </secondaryDataProtection>
    </storageProfile>
    <securityProfile>
        <perimeterFirewall enabled="true">Enterprise Grade Virtual Firewall (Balanced Resource Classes)
            <defaultRules>
                <firewallRule id="10" source="public" sourcePort="http" destination="VM Tier01"
                        destinationPort="http" protocol="tcp" action ="permit" log="no"/>
                <firewallRule id="20" source="public" sourcePort="https" destination ="VM Tier01"
                        destinationPort="https" protocol="tcp" action ="permit" log="no"/>
                <firewallRule id="30" source="public" sourcePort="ssh" destination="VM Tier01"
                        destinationPort="ssh" protocol="tcp" action="permit" log="no"/>
                <firewallRule id="40" source="public" sourcePort="any" destination="any"
                        destinationPort="any" protocol="tcp" action="deny" log="yes"/>
            </defaultRules>
        </perimeterFirewall>
        <serverTierFirewall enabled="true">VMsafe Compatible Virtual Firewall</serverTierFirewall>
        <intrusionDetectionSystem enabled="false"/>
        <securityACLs enabled="true">Configurable Port Profile ACL per virtual port group</securityACLs>
        <fileIntegrityMonitoring>disabled</fileIntegrityMonitoring>
        <urlFiltering>disabled</urlFiltering>
        <waf/>
    </securityProfile>
</serviceProfile>
<serviceProfile name="Essential">
    <locationOptions name="global"/>
    <supportedOSes customerImage="disabled">
        <supportedOS name="rhel4_64Guest" label="RH Linux 4.x" description="Red Hat Enterprise Linux 4.x 64bit" type="linux" showOutsourcingOption="no" />
        <supportedOS name="rhel5_64Guest" label="RH Linux 5.x" description="Red Hat Enterprise Linux 5.x 64bit" type="linux" showOutsourcingOption="no" />
        <supportedOS name="winNetEnterprise64Guest" label="Windows Server 2003 (Ent) " description="Microsoft Windows Server 2003 (Enterprise 64bit)" type="windows" showOutsourcingOption="yes" />
    </supportedOSes>
    <loadBalancerMax>0</loadBalancerMax>
    <nat1to1Available>false</nat1to1Available>
    <computeProfile>
        <size name="Small">
            <cpu speed="1.5" unit="GHz" vCPU="1"/>
            <memory size="1" unit="GB"/>
            <drs pool="Essential"/>
            <serverHA>Best Effort</serverHA>
        </size>
        <size name="Medium">
            <cpu speed="1.5" unit="GHz" vCPU="1"/>
            <memory size="2" unit="GB"/>
            <drs pool="Essential"/>
            <serverHA>Best Effort</serverHA>
        </size>
        <size name="Large">
            <cpu speed="3" unit="GHZ" vCPU="1"/>
            <memory size="2" unit="GB"/>
            <drs pool="Essential"/>
            <serverHA>Best Effort</serverHA>
        </size>
    </computeProfile>
    <networkProfile>
        <vlans Public="1" Private="0">
            <vlan type="Public" maxComputes="253" id="VM Tier01">
                <serverGroup>VM Tier01</serverGroup>
            </vlan>
        </vlans>
        <networkIO>100M Guarantee, Class=Medium</networkIO>
        <internetBandwidth>Zero Commit, 95th Percentile Burst Model</internetBandwidth>
        <applicationPriority pip="disabled"/>
        <sslOffloading ssl="disabled" maxCert="0"/>
        <serverLB>
            <loadBalancing>disabled</loadBalancing>
            <poolingInterval>true</poolingInterval>
            <persistence>
                <option val="Source IP"/>
                <option val="Active Cookie"/>
                <option val="Passive Cookie"/>
            </persistence>
        </serverLB>
        <glbAcceleration glb="disabled" maxServersPerDomainName="0"/>
    </networkProfile>
    <storageProfile>
```

TABLE 2-continued

Example XML Service Catalog Code.

```
            <dataStorage>
                <drives>
                    <drive type="boot" required="yes" incremental="no">
                        <size unit="GB" min="15" max="15" incremental="0" default="15"/>
                        <mountPointOptions>
                            <mountPoint type="windows" defaultName="C:\"/>
                            <mountPoint type="linux" defaultName="/"/>
                        </mountPointOptions>
                    </drive>
                    <drive type="data" required="yes" incremental="yes">
                        <size unit="GB" min="10" max="500" incremental="50" default="10"/>
                        <mountPointOptions>
                            <mountPoint type="windows" defaultName="D:\"/>
                            <mountPoint type="linux" defaultName="/data01"/>
                        </mountPointOptions>
                    </drive>
                    <drive type="data" required="no" incremental="yes">
                        <size unit="GB" min="50" max="500" incremental="50" default="50"/>
                        <mountPointOptions>
                            <mountPoint type="windows" defaultName="E:\"/>
                            <mountPoint type="linux" defaultName="/data02"/>
                        </mountPointOptions>
                    </drive>
                    <drive type="data" required="no" incremental="yes">
                        <size unit="GB" min="50" max="500" incremental="50" default="50"/>
                        <mountPointOptions>
                            <mountPoint type="windows" defaultName="F:\"/>
                            <mountPoint type="linux" defaultName="/data03"/>
                        </mountPointOptions>
                    </drive>
                </drives>
            </dataStorage>
            <performance>1 Tier ILM</performance>
            <accessMethod>Block Based SAN</accessMethod>
            <availability>Dual Path Redundant SAN</availability>
            <primaryDataProtection>SNAP copies every 24 hours, 36 hour retention</primaryDataProtection>
                <secondaryDataProtection>
                <retention length="1" unit="month"/>
                <retention length="3" unit="month"/>
                <retention length="6" unit="month"/>
                <retention length="12" unit="month"/>
                <retention length="36" unit="month"/>
                <retention length="84" unit="month"/>
            </secondaryDataProtection>
        </storageProfile>
        <securityProfile>
            <perimeterFirewall enabled="false"/>
            <serverTierFirewall enabled="false"/>
            <intrusionDetectionSystem enabled="false"/>
            <securityACLs enabled="true">Configurable Port Profile ACL per server a N1k
            </securityACLs>
            <fileIntegrityMonitoring>disabled</fileIntegrityMonitoring>
            <urlFiltering>disabled</urlFiltering>
            <waf/>
        </securityProfile>
    </serviceProfile>
    </serviceProfiles>
    </product>
</serviceCatalog>
```

Via a user interface to present the various user selectable options, an XML design file may be constructed for the automatic provisioning of the VPDC. Example embodiments of this portion of the Cloud OS are described in U.S. patent application Ser. No. 12/646,591, filed on Dec. 23, 2009, the entire contents of which are expressly incorporated herein by reference. VPDCs may be provisioned via a portal manager constructed XML design file, similar to that described in the incorporated reference. Portions of the design may be customizable within the service level selection (e.g., a "Balanced" service level may provide VMs with storage between 50 and 500 GB, leaving the user to select the desired level), while other portions may be fixed by the selection of the service level. Options may also exist for automatic level selections of resources. For example, customers may pay some fractional amount for each GB of storage, with a minimum of 50 per VM and a maximum of 500, and have those GBs provisioned in real-time, based on usage rates of the customer.

As part of the provisioning, each VPDC may be given its own set of network capabilities per service profile. For example, a VPDC that has the highest level of QoS SLA from the data center edge router all the way down to the 1 Gbps network for each Virtual Machine may be provided with a QoS level of 5. The network QoS may be enhanced with private Multiprotocol Label Switching (MPLS) network connectivity that provides end-to-end QoS across the network. Most clouds are only accessible over the public Internet which offers no QoS beyond priority 0, best effort. Using the models described herein, a MPLS connection may be made with the customer(s), which may allow for QoS levels as a service within VPDC provisioning. With public Internet, Secure Socket-Layer (SSL) Virtual Private Network (VPN) may provide a high QoS within a tunneled connection for added security. Additionally, at the highest level, Global Load Balancing (GLB) and Server Load Balancing (SLB) capabilities may be provided for some number of server pools, e.g., eight. GLB may enable site selection to ensure the best cloud VDC will be able to meet the requirements of the server request.

At the lowest level, e.g., a QoS level of 1, best effort network service may be provided. This may leave room for multiple levels of service between, e.g., 2, 3, and 4. Level 1 may primarily be a whatever capacity is left unused level of service, or may alternatively specify some minimal levels of service.

As part of the provisioning, each VPDC profile may receive security from multiple levels of available security QoS. At the lowest end of service levels, it may be that only virtual firewalls and Access Control Lists (ACLs) are provided. At a higher level of service, the virtual Firewall may be enhanced for more flexibility, and additional features may be added, such as an intrusion detection alarm system (IDAS). For one example embodiment, the highest level of security QoS may include a physical firewall, an Intrusion Protection System (IPS), a File Integrity Monitor, and one or more Web Application Firewall(s) (WAFs) may be provided.

The security profile design may also take into account that often, at the lowest level, the test/develop environment may be flat and typically require some basic perimeter firewall capability. At the next higher level, a requirement to support multiple tiers, for example web, application, database or front-office/back-office application deployment methodologies may require the security profiles to enable public interface to the first tiers of services through a perimeter firewall. The next level up may include a deep packet inspection capable firewall between the web application tier and the application tier, and between the application tier and the database tier (e.g., 221 and 222 of FIG. 2). This may require understanding the communication flows between each tier and layer. Such as specific application architecture and the latency requirements of certain applications and configurations. Communication flow information may also include which security ports to open for these inter-tier security elements, along with an identification of what zones each customer wants to isolate from other traffic.

In order to achieve this added inter-tier security one or more service levels may create a separate VLAN per tier. This may require inter-tier traffic to flow back to the core switch and thus get inspected by a firewall. To do this with separate hardware may add significant latency to customer traffic, and added stress on the overall network performance. However, by structuring the segregations as Virtual LANs and providing the entire VPDC with virtualization, all the traffic can stay within the same network domain. Thus, for one or more service levels a single network domain may be established that is segmented into some number (e.g., 3) of port groups (e.g., a logical container for each tier). This may provide a tier segmentation without significant added latency. A Server Tier firewall may then be defined to have a policy for each tier and provide a security boundary between each tiers.

As part of the provisioning, each VPDC profile may include a level of data storage. Information Lifecycle Management (ILM) may enable data to waterfall down to lower-cost data stores as the data access on these files decreases. At the lowest level of service, it may be that only one tier of ILM is available. At the highest level of service, it may be that 3 tiers are available. For example, in the Essential service profile there may be a single tier (e.g., tier-3 SATA storage). Moving up a service tier, the Balanced service profile may initially use a tier-2 storage that include 10 k rpm fibre channel drives, while less frequently used data may automatically migrate down to the tier-3 SATA storage system. The Premier service profile may initially use a tier-1 storage including 15 k rpm fibre channel drives, while less frequently used data may automatically migrate down to the tier-2 storage, while even less frequently used data may automatically migrate down to the tier-3 storage.

Further, each storage service level may provide a different level of back-up service and/or retention time. For example, the highest level of service may provide fault-tolerant back-up for 24 months, while the lowest level may provide generic (e.g., single copy) back-up for only 4 months. Each profile may also define a compute QoS that includes operating system(s), applications, configurations, etc. The compute profile may define how many Virtual Machines are available at any one time, and how much execution throughput is available to each or the set of VMs.

Figure 3:
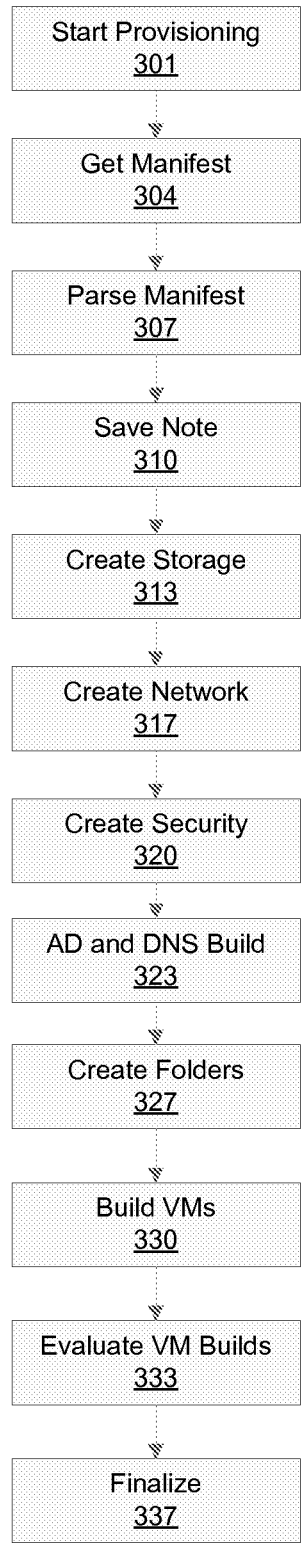
FIG. 3 illustrates an example method, according to one example embodiment of the present invention.

After a user makes the desired selections to form an XML design file, an automated provisioning method may begin. One example is found in FIG. 3. The example method may start the provisioning process at 301, which may load a manifest created based on the XML design file (or alternatively may load the XML design file itself to be used as the manifest), e.g., at 304. Next, at 307, the example provisioning method may parse the manifest to pull all the variables specified in the manifest to be used by subsequent provisioning subroutines. At this point the actual provisioning subroutines may be called, but first, at 310, the example method may call a save note function to save the initial state information. This may allow for a persistent context, which may be resumed or recovered from, in the event of a process failure.

The example method may next create the storage at 313, which may include a multi-step process to create a volume, map it to the ESX hosts, and create a data store for the VPDC. Next, at 317, the network provisioning subroutine may be executed, which may include a multi-step process to check device connectivity, check if requested VLANs exist, provision the VLANs, and establish/provision the port-profiles. Next, at 320, the security provisioning subroutine may be executed, which may include a multi-step process to create security ACLs for one or more service levels (e.g., Essential VPDCs). For service levels with even more provisioned security, the security subroutine may provide ACE context, NAT, and perimeter firewall rules (e.g., for Balanced VPDCs).

Next, at 323, an AD and DNS build subroutine may create OUs, groups, and users in a network directory service (e.g., Active Directory), along with creating a customer's domain name server zone. At 327, the example method may create folders for the VPDC. This may be done with a number of tools/services, e.g., an Open Source Software (OSS) Web Service and vSphere™. At 330, the example method may build one or more Virtual Machines using a Build VMs subroutine to provision one or more Windows® and/or Linux virtual machines. The VM build(s) may be checked (serially or in parallel) by confirming each result of the global build outputs, or by performing one or more verifying calculations. At 337 the example method may finalize the provisioning operations, e.g., by deleting install files no longer needed, emailing the customer that the VPDC is ready and providing usage information, and opening up the network for outside traffic to the VPDC.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

We claim:

1. A provisioning system for a cloud computing network, comprising:
a storage device, storing:
a plurality of point of deployment (POD) data structures, each POD data structure storing parameter data for a respective service supplied by the cloud under a variety of configurations supported by the service,
a plurality of virtual private data center (VPDC) data structures, each VPDC data structure storing parameter data extracted from the POD structures according to a respective level of service selected by a respective tenant, and
a processor that executes code to present a user interface for engagement with a tenant of the cloud network, to present data of the VPDC data structures to a tenant and receive selections in response thereto, and further to provision a tenant VPDC within the cloud according to the selected VPDC configurations and service level.

2. The system of claim 1, wherein to provision includes establishing a plurality of application tiers; wherein to provision further includes establishing network services including a unique virtual local area network (VLAN) for each application tier; wherein to provision further includes creating separate port groups and assigning a unique port group to each VLAN.

3. The system of claim 2, wherein to provision further includes establishing a firewall between each VLAN.

4. A method of provisioning resources of a cloud computing network by a cloud tenant, comprising:
retrieving, by a computer and from storage, data of a plurality of Virtual Private Data Center (VPDC) configuration options, the VPDC configuration options storing parameter data extracted from POD data structures of the cloud network, the POD data structures storing parameter data for a respective service supplied by the cloud under a variety of service configurations,
presenting, by the computer, the retrieved configuration options to the tenant,
receiving, by the computer, selections in response to the presented configuration options, and
installing, by the computer, a Virtual Private Data Center (VPDC) instance within the cloud network according to the configurations selected.

5. The method of claim 4, wherein the VPDCs are configured to migrate from one cloud site to another cloud site within the cloud network.

6. The method of claim 4, wherein the parameter data includes defining processor power, data storage, and network capacity.

7. The method of claim 4, wherein a plurality of data storage tiers are available and wherein a lesser service level is associated with a lesser data storage tier and a greater service level is associated with a greater data storage tier.

8. The method of claim 7, wherein data associated with a VPDC associated with the greater service level is initially stored in the greater data storage tier, and parts of the data that are infrequently accessed are migrated to the lesser data storage tier.

9. The method of claim 4, wherein the installing includes establishing a plurality of application tiers; wherein the installing further includes establishing network services including a unique virtual local area network (VLAN) for each application tier; wherein the installing further includes creating separate port groups and assigning a unique port group to each VLAN.

10. The method of claim 9, wherein the installing further includes establishing a firewall between each VLAN.

11. A method of provisioning a Virtual Private Data Center (VPDC) in a cloud network of physical data centers, comprising:
providing, by a computer, a design user interface to a user;
receiving, by the computer, configuration selections from the user, including a service level selection;
creating, by the computer, a design manifest based on the configuration selections;
automatically provisioning, by the computer, a VPDC based on the design manifest, wherein the VPDC is provisioned in a cloud site physical data center configured to provide a plurality of VPDCs, and wherein the cloud site physical data center is organized with a plurality of service deployments and a plurality of compute-resource deployments, which together provide the VPDCs, based on configuration data specified by each VPDC.

12. The method of claim 11, wherein the VPDCs are configured to migrate from one cloud site physical data center to another cloud site physical data center.

13. The method of claim 12, wherein the plurality of service deployments and the plurality of compute-resource deployments are standardized at each cloud site physical data center.

14. The method of claim 11, wherein substantial portions of the VPDC are defined by the service level selection.

15. The method of claim 14, wherein the substantial portions include defining processor power, data storage, and network capacity.

16. The method of claim 15, wherein a plurality of data storage tiers are available and wherein a lesser service level is associated with a lesser data storage tier and a greater service level is associated with a greater data storage tier.

17. The method of claim 16, wherein data associated with a VPDC associated with the greater service level is initially stored in the greater data storage tier, and parts of the data that are infrequently accessed are migrated to the lesser data storage tier.

18. The method of claim 11, wherein the provisioning includes establishing a plurality of application tiers; wherein the provisioning further includes establishing network services including a unique virtual local area network (VLAN) for each application tier;
wherein the provisioning further includes creating separate port groups and assigning a unique port group to each VLAN.

19. The method of claim 18, wherein the provisioning further includes establishing a firewall between each VLAN.

* * * * *